US012183167B2

(12) United States Patent
Wei

(10) Patent No.: US 12,183,167 B2
(45) Date of Patent: Dec. 31, 2024

(54) COIN OPERATED GAME MACHINE

(71) Applicant: PAOKAI ELECTRONIC ENTERPRISE CO., LTD., Kaohsiung (TW)

(72) Inventor: Ming-Shan Wei, Kaohsiung (TW)

(73) Assignee: PAOKAI ELECTRONIC ENTERPRISE CO., LTD., Kaohsiung (TW)

( * ) Notice: Subject to any disclaimer, the term of this patent is extended or adjusted under 35 U.S.C. 154(b) by 265 days.

(21) Appl. No.: 17/882,005

(22) Filed: Aug. 5, 2022

(65) Prior Publication Data

US 2023/0326304 A1 Oct. 12, 2023

(30) Foreign Application Priority Data

Apr. 8, 2022 (TW) ................................ 111113429

(51) Int. Cl.
*G07F 17/32* (2006.01)

(52) U.S. Cl.
CPC ...... *G07F 17/3297* (2013.01); *G07F 17/3251* (2013.01)

(58) Field of Classification Search
CPC .............. G07F 17/3297; A63F 2250/13; A63F 2250/136
See application file for complete search history.

(56) References Cited

U.S. PATENT DOCUMENTS

| | | | | |
|---|---|---|---|---|
| 5,752,699 A * | 5/1998 | Crompton | G07F 17/3297 | 273/138.2 |
| 7,172,197 B2 * | 2/2007 | Wilson | G07F 17/3297 | 273/288 |
| 2003/0073479 A1 * | 4/2003 | Wilson | G07F 17/3213 | 463/16 |
| 2014/0052623 A1 | 2/2014 | Pitroda et al. | | |
| 2020/0134982 A1 * | 4/2020 | Dluzen | A63F 9/30 | |

FOREIGN PATENT DOCUMENTS

| | | | |
|---|---|---|---|
| CN | 101283382 A | 10/2008 | |
| CN | 107583275 A | 1/2018 | |
| GB | 2380417 A * | 4/2003 | G07F 17/3213 |
| TW | M378022 U | 4/2010 | |
| TW | 202014229 A | 4/2020 | |

OTHER PUBLICATIONS

Search Report appended to an Office Action, which was issued to Taiwanese counterpart application No. 111113429 by the TIPO on Dec. 14, 2022, 1 page with an English translation thereof, 1 page.

* cited by examiner

*Primary Examiner* — Milap Shah

(57) ABSTRACT

A coin operated game machine is adapted to operate through a plurality of coins, and includes a machine bed unit, an operation unit, and a back-end unit. The machine bed unit includes a main body defining a sealed space, and an operation table dividing the sealed space into a game region and a recognition region. The operation unit includes a coin-passing mechanism, a token-passing mechanism, a plurality of game tokens for being outputted to the sealed space, and an identification module identifying each of the game tokens that falls to the recognition region. The back-end unit includes a ticket-passing module configured to output at least one ticket according to identification of the identification module.

3 Claims, 4 Drawing Sheets

COIN OPERATED GAME MACHINE

CROSS-REFERENCE TO RELATED APPLICATION

This application claims priority to Taiwanese Invention Patent Application No. 111113429, filed on Apr. 8, 2022.

FIELD

This invention relates to a game machine, more particularly to a coin operated game machine.

BACKGROUND

Referring to FIG. 1, an existing coin operated game machine 1 is used in cooperation with a plurality of tokens 20. The coin operated game machine 1 includes a main body 11 surrounding and defining an interior space 110 having a coin outlet 111 located at a bottom portion thereof, an introduction mechanism 12 connected to the main body 11 and adapted for introducing the tokens 20 into the interior space 110, a platform 13 disposed in the interior space 110 and adapted for accumulating the tokens 20, and a plurality of operating mechanisms 14 (only one is shown) disposed on the platform 13 and adapted for pushing the tokens 20. To operate the coin operated game machine 1, the tokens 20 are inserted one by one into the introduction mechanism 12, and the platform 13 is stacked with the tokens 20 in advance. The status of the tokens 20 stacked on the platform 13 is changed by more tokens being inserted one by one through the induction mechanism 12. By operation of the fixed mode of the operation mechanisms 14, part of the tokens 20 on the platform 13 may be pushed and fall from the platform 13, and be outputted from the coin outlet 111.

However, when the existing coin operated game machine 1 is in operation, the number of the tokens 20 inputted into the introduction mechanism 12 and the number of the tokens 20 that are pushed and fall from the platform 13 are usually different. Furthermore, to balance game fairness and user enjoyment, the number of the tokens 20 that should be deposited on the platform 13 in advance needs to be prudently considered as well. Since the number of incoming tokens 20 cannot be known for certain, the stack status of the tokens 20 on the platform 13 needs to be frequently adjusted. Also, in addition to the contact occurred during the above mentioned maintenance and adjustment, the tokens may be frequently touched outside of the coin operated game machine 1 since they are usually circulated in game sites, which causes that the tokens 20 may become a medium of transmission for viruses or bacteria.

SUMMARY

Therefore, the object of the present invention is to provide a coin operated game machine that is easy to maintain and that can improve sanitary conditions.

According to this invention, a coin operated game machine is adapted to operate through a plurality of coins, and includes a machine bed unit, an operation unit mounted to the machine bed unit, and a back-end unit connected to the operation unit. The machine bed unit includes a main body defining a sealed space, and an operation table disposed in the sealed space, the operation table dividing the sealed space into a game region, and a recognition region disposed underneath the game region, and has an end edge cooperating with the main body to define a drop opening that is disposed between the game region and the recognition region. The operation unit includes a coin-passing mechanism mounted to the main body and adapted for the coins to be disposed therein, a token-passing mechanism informationally connected to the coin-passing mechanism, a plurality of game tokens stored in the token-passing mechanism and adapted to be outputted to the sealed space after the coins are dispensed into the coin-passing mechanism, and an identification module disposed in the recognition region and identifying each of the game tokens that falls from the drop opening to the recognition region, and transmitting reward information according to the identification result. The back-end unit includes a ticket-passing module that is informationally connected to the identification module, and that is configured to output at least one ticket according to the reward information transmitted by the identification module. The effect of this invention resides in that, after the coins are inserted, the game tokens are used in the game played in the sealed space instead, and the reward obtained by playing the game is the at least one ticket. Thus no frequent maintenance or adjustment is required, and whether it is maintained or in the process of the game, the opportunity to be in contact with the tokens circulated outside is reduced, thereby optimizing the sanitary condition during use of the present invention.

BRIEF DESCRIPTION OF THE DRAWINGS

Other features and effects related to the present invention will be clearly presented in the embodying manner with reference to the drawings, in which.

DETAILED DESCRIPTION

Figure 1:
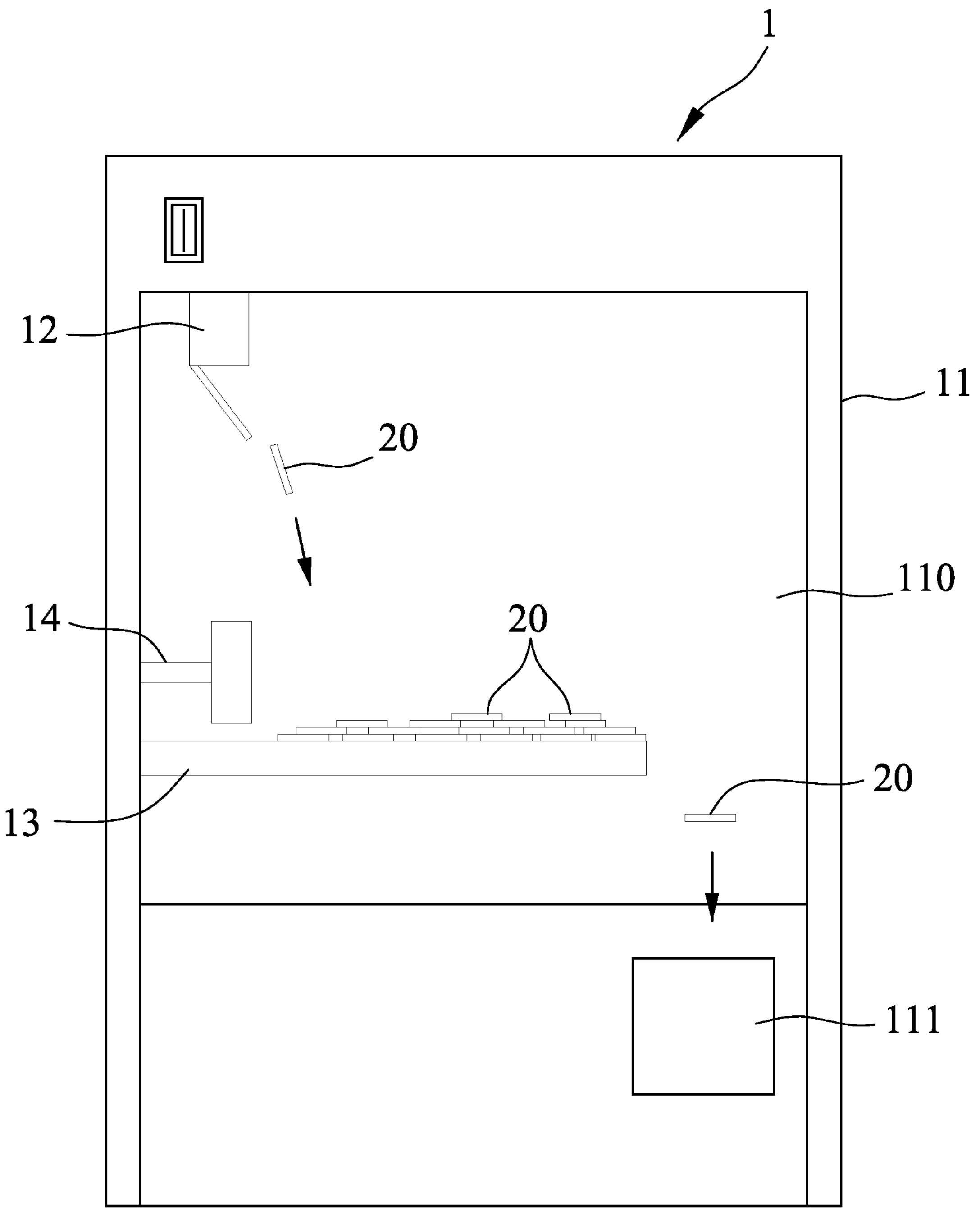
FIG.1 PRIOR ART
FIG. 1 is a schematic diagram illustrating a known coin operated game machine.
Figure 2:
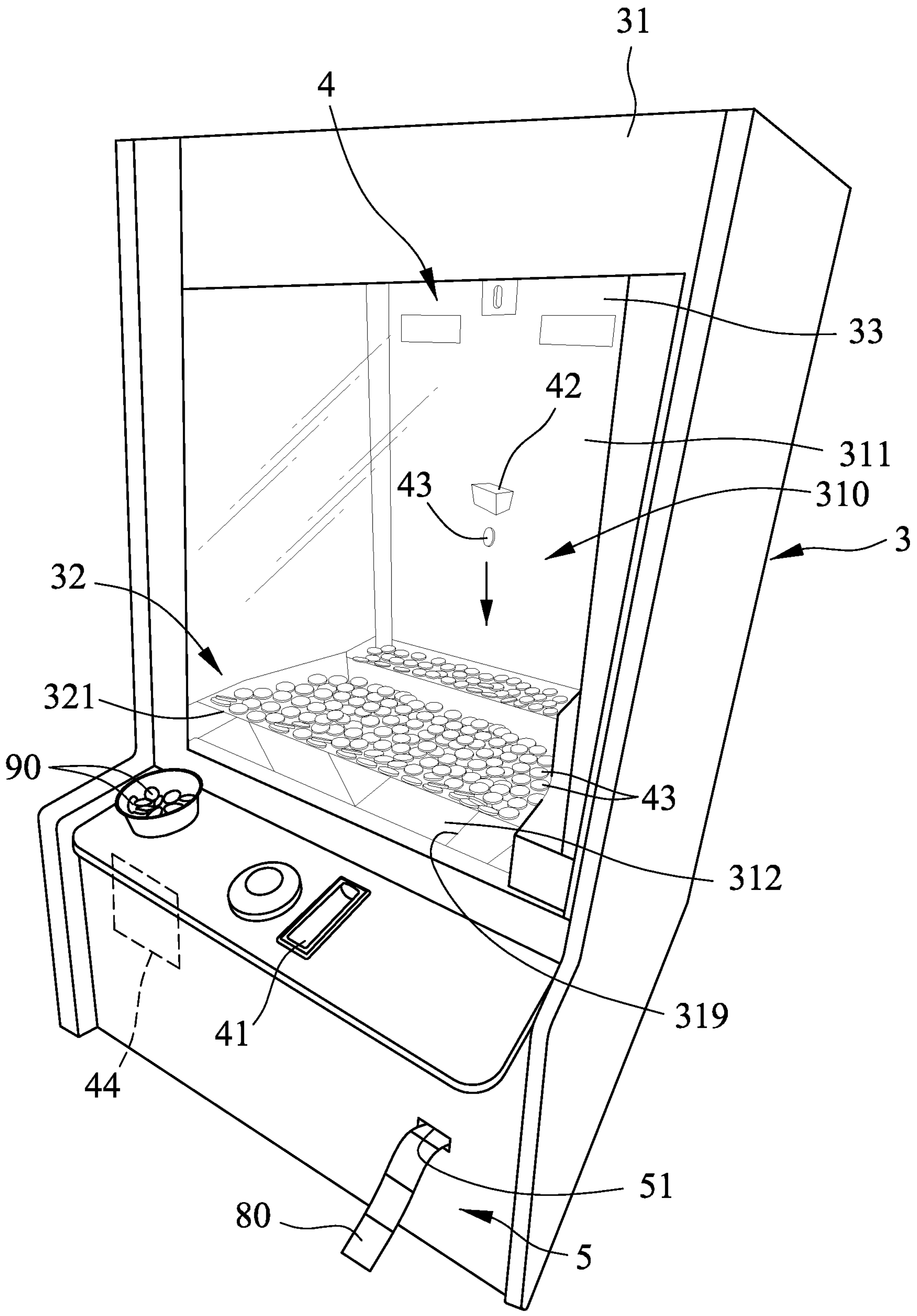
FIG. 2 is a perspective view of an embodiment of a coin operated game machine of the present invention.

Referring to FIG. 2, an embodiment of a coin operated gaming machine according to the present invention is adapted to operate through a plurality of coins 90. The present embodiment includes a machine bed unit 3, an operation unit 4 mounted to the machine bed unit 3, and a back-end unit 5 connected to the operation unit 4, wherein, in this embodiment, which is described as one that is disposed in an amusement arcade, the coins 90 are metal coins that are exclusively used in the amusement arcade.

The machine bed unit 3 includes a main body 31 defining a sealed space 310, an operation table 32 disposed in the sealed space 310, and an interface board 33 disposed on a rear side of the operation table 32. The operation table 32 divides the sealed space 310 into a game region 311, and a recognition region 312 disposed underneath the game region 311, and has an end edge 321 spaced apart from a front side of the main body 31 and cooperating with the front side of the main body 31 to define a drop opening 319 that is disposed between the game region 311 and the recognition region 312. In addition to being the main platform for a game to take place, the operation table 32 is further disposed with a plurality of dynamic mechanisms, such as rollers of a pinball machine and/or a mechanical arm of a traditional coins pusher machine that are relevant to the topic, the game mechanics, or the operation mechanism of the game, etc., the details of which are omitted for the sake of brevity. The interface board 33 is used to display game information such as the number of coins, and the reward score, and specifically is located at a rear side of the operation table 32 opposite to the end edge 321, so that it can be watched by a player without interfering with the game.

The operation unit 4 includes a coin-passing mechanism 41 mounted to the main body 31 and adapted for the coins 90 to be disposed therein, a token-passing mechanism 42 informationally connected to the coin-passing mechanism 41, a plurality of game tokens 43 stored in the token-passing mechanism 42 and adapted to be outputted to the sealed space 310 after the coins 90 are dispensed into the coin-passing mechanism 41, and an identification module 44 disposed in the recognition region 312, identifying each of the game tokens 43 that falls from the drop opening 319 to the recognition region 312, and transmitting reward information according to the identification result. Specifically, when a player inserts the coins 90 into the coin-passing mechanism 41, the coins 90 do not fall directly onto the operation table 32, and instead the game tokens 43 are outputted onto the operation table 32 by the token-passing mechanism 42. While the operation table 32 has been stacked with a preset number of the game tokens 43, the game is played with the additional game tokens 43 that fall onto the operation table 32.

Figure 3:
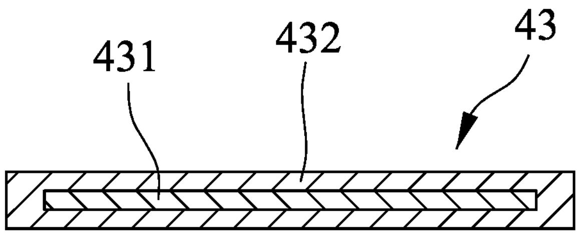
FIG. 3 is a sectional view illustrating a game token of an operation unit of the embodiment.

Referring to FIG. 3, each of the game tokens 43 includes a radio frequency identification chip 431 and a forming block 432 wrapping and fixing the radio frequency identification chip 431 thereinto. The radio frequency identification chips 431 are implemented by radio frequency identification (RFID) technology, and therefore the identification module 44 (see FIG. 2 or FIG. 4) is an equipment capable of reading radio frequency signals. Each of the radio frequency identification chips 431 of the game tokens 43 includes a plurality of value information representing different values, and specifically, the value information is the information related to game scores, such as the currency value of the game tokens 43. The forming block 432 is preferably be made from a plastic material so that it is suitable to be shaped into an appropriate size according to the game requirements.

Figure 4:
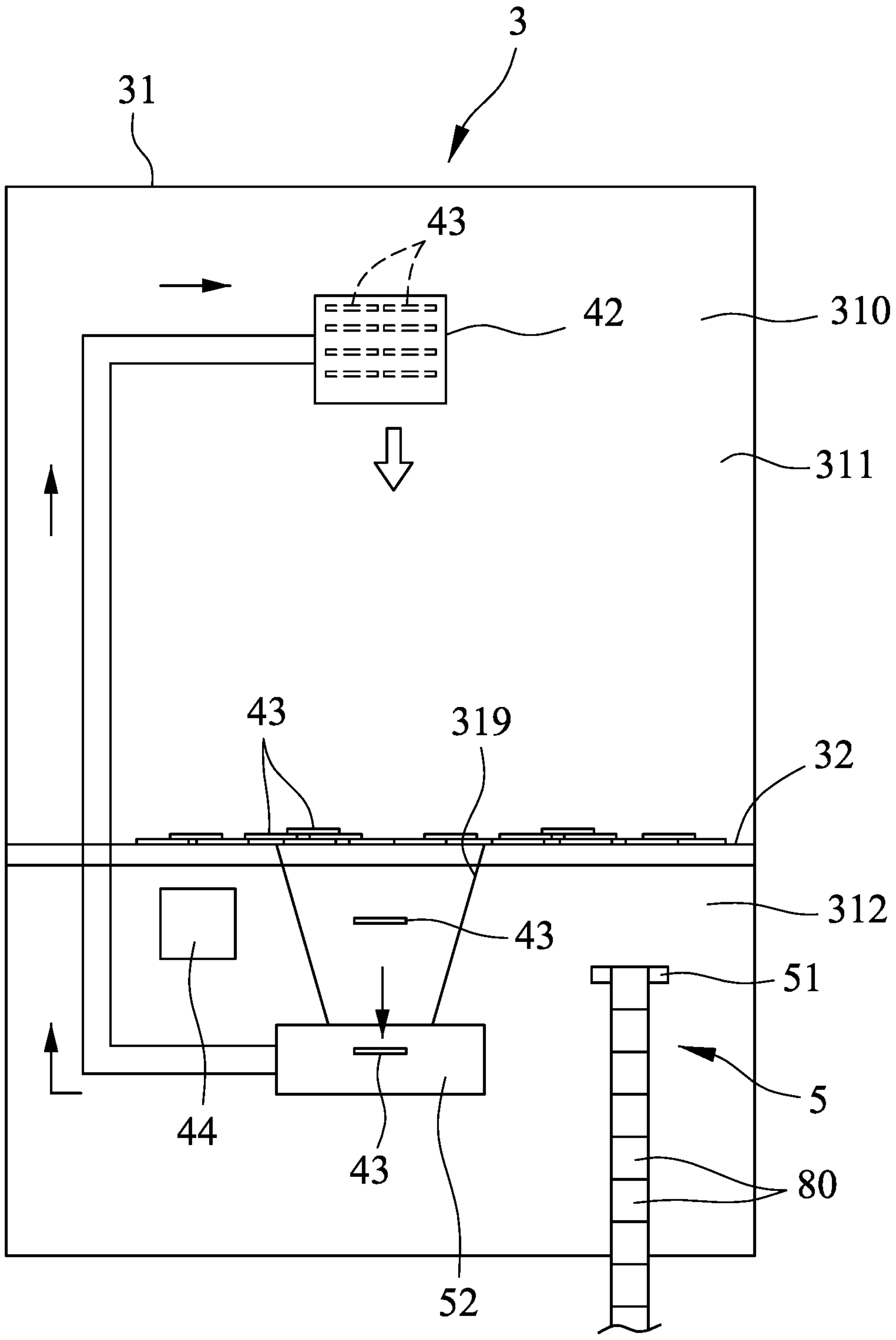
FIG. 4 is a schematic view, illustrating a backend unit of the embodiment and an operation mode of the embodiment.

Referring to FIG. 2 and FIG. 4, the back-end unit 5 includes a ticket-passing module 51 informationally connected to the identification module 44 and configured to output at least one ticket 80 according to the reward information transmitted by the identification module 44, and a circulation mechanism 52 disposed in the recognition region 312 and in spatial communication with the token-passing mechanism 42. The circulation mechanism 52 is for receiving the game tokens 43 falling into the recognition region 312 and directing the game tokens 43 back to the token-passing mechanism 42.

In this embodiment, after the coins 90 are inserted into the coin mechanism 41, a number of the game tokens 43 are correspondingly outputted according to a currency converting rule between the coins 90 and the game tokens 43 that has been determined beforehand from the token-passing mechanism 42. Then, the game tokens 43 are introduced into the sealed space 310 by the token-passing mechanism 42 and drop onto the operation table 32 for gaming. When any of the game tokens 43 falls from the drop opening 319 to the recognition region 312 during the process of the game, the identification module 44 reads the value information of the dropping game token 43 to thereby generate the reward information relevant to the game score, and transmits the corresponding reward information. When the ticket-passing module 51 receives the reward information, it will output a specific number of tickets 80 corresponding to the game score, and a player may exchange the tickets 80 with prizes according to the exchanging rule of the amusement arcade. During the operations described above, because players only insert the coins 90, which they have exchanged with money, into the coin-passing mechanism 41, and because what they receive from the coin operated game machine are the tickets 80 instead of the coins 90, the opportunity of contacting or touching the coins 90 is reduced, which naturally reduces the probability of being infected by bacteria or coming in contact with pathogenic bacteria on the coins 90. For both players and maintenance personnel, sanitary conditions are significantly improved.

It should be particularly noted that, in addition to the game tokens 43 previously set on the operation table 32 due to the game balance, the token-passing mechanism 42 also stores a certain number of the game tokens 43. As for the game tokens 43 that are outputted from the token-passing mechanism 42, apart from those that stay on the operation table 32, the game tokens 43 that drop into the circulation mechanism 52 during the gaming process are directed back into the token-passing mechanism 42 to be stored and be ready for the following output. That is, the game tokens 43 in this embodiment can be continuously circulated for operation, as long as the number of the game tokens 43 is set to be sufficient enough to maintain operation. It is not necessary to fill additional game tokens 43 into the coin operated game machine. Therefore, the frequency of maintenance is reduced, and the game tokens 43 will not be frequently touched in this embodiment, which is also helpful for improving sanitary conditions.

In summary, the embodiment of the coin operated game machine of this invention maintains the game operation by circulating a certain number of the game tokens 43, which reduces the frequency of maintenance, and which further reduces the opportunity of touching or exchanging the coins 90 that are circulated outside the coin operated game machine, and thus it can also improve the sanitary condition during maintenance or gaming process.

However, the above is merely an embodiment of the present invention, and certainly should not be limited to the scope of this invention. Any equivalent variation and modification made according to the claims of the present invention and the specification should still be deemed to fall within the scope covered by the present invention.

What is claimed is:

1. A coin operated game machine adapted to operate through a plurality of coins, and including:

a machine bed unit including a main body defining a sealed space, and an operation table disposed in the sealed space, the operation table dividing the sealed space into a game region, and a recognition region disposed underneath the game region, the operation table having an end edge cooperating with the main body to define a drop opening that is disposed between the game region and the recognition region;

an operation unit mounted to the machine bed unit and including a coin-passing mechanism that is mounted to the main body and that is adapted for the coins to be disposed therein, a token-passing mechanism informationally connected to the coin-passing mechanism, a plurality of game tokens stored in the token-passing mechanism and adapted to be outputted to the sealed space after the coins are dispensed into the coin-passing mechanism, and an identification module disposed in the recognition region, identifying each of the game tokens that falls from the drop opening to the recognition region, and transmitting reward information according to the identification result; and a back-end unit connected to the operation unit and including a ticket-passing module that is informationally connected to the identification module, and that is configured to output at least one ticket according to the reward information transmitted by the identification module;

wherein each of the game tokens of the operation unit includes a radio frequency identification chip and a forming block wrapping and fixing the radio frequency identification chip thereinto;

wherein the radio frequency identification chips of the game tokens of the operation unit each include a plurality of value information representing different values, and the identification module reads the value information and transmits the reward information that corresponds to the value information; and wherein the machine bed unit further includes an interface board disposed on a side of the operation table opposite to the end edge.

2. The coin operated game machine as claimed in claim 1, wherein the forming block of each of the game tokens is made from a plastic material.

3. The coin operated game machine as claimed in claim 1, wherein the back-end unit further includes a circulation mechanism disposed in the recognition region and in spatial communication with the token-passing mechanism, and for receiving the game tokens falling into the recognition region and directing the game tokens back to the token-passing mechanism.

* * * * *